Sept. 9, 1958   H. W. MARTIN ET AL   2,851,171
MATERIAL HANDLING APPARATUS
Filed July 25, 1955   2 Sheets-Sheet 1

HOWARD W. MARTIN
ROBERT B. GARDNER
INVENTORS

HUEBNER, BEEHLER,
WORREL & HERZIG
ATTORNEYS

BY
Richard M. Worrel

Sept. 9, 1958  H. W. MARTIN ET AL  2,851,171
MATERIAL HANDLING APPARATUS
Filed July 25, 1955  2 Sheets-Sheet 2

HOWARD W. MARTIN
ROBERT B. GARDNER
INVENTORS
HUEBNER, BEEHLER,
WORREL & HERZIG
ATTORNEYS
BY Richard M. Worrel United States Patent Office 2,851,171
Patented Sept. 9, 1958

2,851,171

MATERIAL HANDLING APPARATUS

Howard W. Martin and Robert B. Gardner, Fresno, Calif., assignors to Jourdan Concrete Pipe Co., Fresno, Calif., a corporation of California Application July 25, 1955, Serial No. 524,058

14 Claims. (Cl. 214—2)

The present invention relates to a material handling apparatus and more particularly to a conveying apparatus for weighing conveyed materials. The term "conveying" as employed herein is intended to include all movement of materials from one place to another, and from a place and return thereto, whether the movement be elevational, earth traversing or a combination thereof.

This invention seeks to overcome several deficiencies existing in present day loading machines of the type generally including an elongated boom mounting a bracket, scoop or other conveying receptacle and operable to shovel, load and convey a load of aggregate materials, such as sand, gravel, cement, soil or the like, from a stock pile to a convenient point of deposit, such as a mixer, truck or other receiving means or place. Generally such machines are hydraulically operated.

The utility of the present invention can best be visualized by reference to the mixing of measured quantities of aggregate material as in the formation of concrete, asphalt-aggregate paving materials, and the like. The quality of the resultant product is frequently dependent upon the accuracy of measuring of the constituents. The ultimate price of the product depends not only upon the cost of the constituents and the proportions employed but upon the labor involved in selecting, handling, weighing, mixing and the like. It is well known that the successive measuring, handling, and mixing operations are laborious and time consuming and thus expensive. The present invention is based upon the discovery that the requisite measuring and handling can be concurrently performed with substantial savings in labor, time and expense.

Accordingly, an object of the present invention is to provide a conveying apparatus for weighing conveyed materials.

Another object is to obviate the excessive labor required by the repetitious handling of aggregate materials required by conventional successive weighing and conveying practices.

Another object is to provide an apparatus including a receptacle for receiving a load which is adapted to measure the weight of a load in the receptacle.

Another object is to provide a hydraulic load supporting apparatus having provision for measuring in units of weight the hydraulic supporting force applied at any given time.

Another object is to provide a material conveying apparatus adapted to weigh conveyed material and manually or automatically to dump any excess of such material above a predetermined amount.

Another object is to provide an arrangement for selectively adjusting the load weight desired in an apparatus as provided in the foregoing paragraph.

Other objects are to provide a material handling apparatus which is of economical and simplified construction, easily maintained, dependable in operation, which saves considerable time and labor, and which is effective in performing its intended functions.

These, together with other objects, will become more fully apparent upon reference to the following description.

Figure 1:
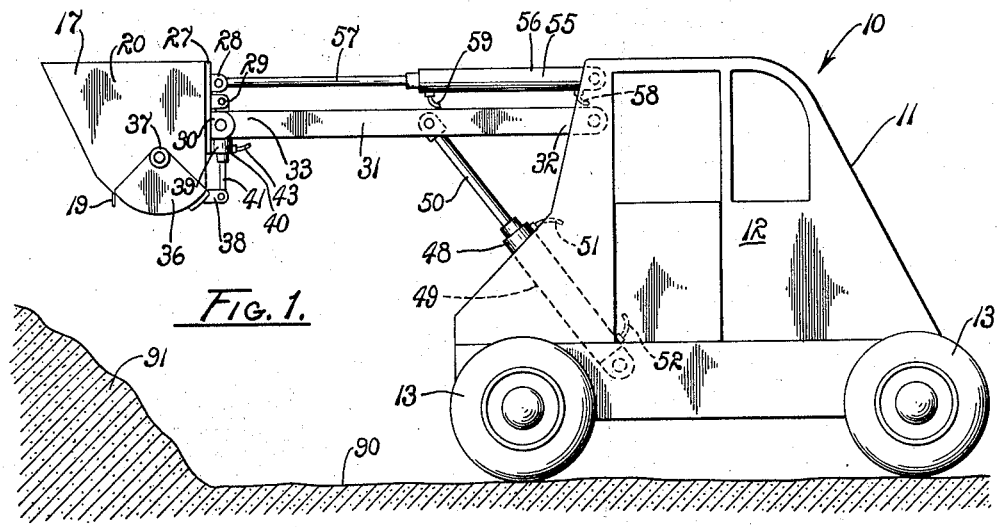
Fig. 1 is a side elevation of a material conveying apparatus providing a load conveying bucket and embodying the principles of the present invention.

Referring more particularly to the drawings:

A material conveying apparatus is generally indicated by the numeral 10 in Fig. 1. The illustrated apparatus is typical of many machines adapted to load and convey aggregate or bulk materials, such as dirt, sand, gravel, cement, grain and the like. The apparatus 10 includes a mobile truck 11 providing a cab 12 mounted on support wheels 13 for earth traversing movement.

Figure 2:
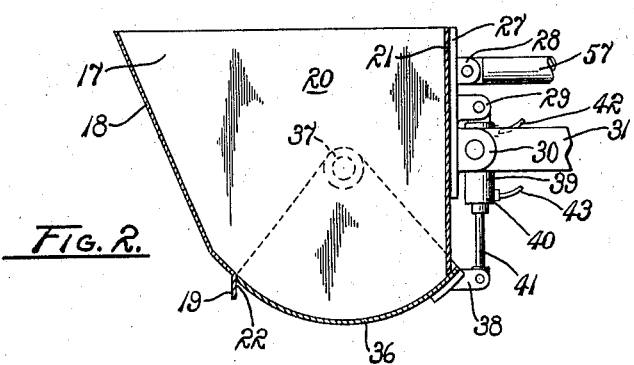
Fig. 2 is a somewhat enlarged vertical section taken through the bucket shown in the apparatus of Fig. 1.

A bucket, scoop, shovel or other receptacle 17 is shown in Figs. 1 and 2 and provides a forward wall 18 having a downwardly extended lower lip 19. The bucket also has a pair of side walls 20, a rear wall 21 and a downwardly disposed discharge opening 22. The bucket is open at the top and is thus adapted for receiving a load of materials to be conveyed therein.

A mounting plate 27 is attached, as by welding, to the rear wall 21 of the bucket 17. Upper, lower and middle mounting ears 28, 29 and 30, respectively, are extended rearwardly from the mounting plate. An elongated boom 31 provides a rearward end 32 pivotally mounted on the mobile truck 11 for vertical or elevational swinging movement around a substantially horizontal axis. The boom also has a forward end 33 pivotally connected to the lower mounting ears 30.

A sectionally cylindrical gate 36 is supported on the bucket 17 by pivot journals 37 concentric to the gate extended outwardly from each of the sides 20. The gate is thus mounted for movement between a closed position in covering relation to the discharge opening 22 and an open position rearwardly retracted therefrom. The lip 19 is provided to limit forward pivotal movement of the gate and to insure its correct positioning over the opening when closed. A bracket 38 is attached to the gate and a hydraulic gate control ram 39 is provided including a cylinder 40 pivotally connected to the middle mounting ear 29 and a reciprocal piston rod 41 pivotally connected to the bracket. Ram extension and ram retraction conduits 42 and 43, respectively, are connected to the cylinder. It is to be noted that the gate is closed when the ram is extended and opened when the ram is retracted. Obviously the reverse operation could be provided if desired, by well known expedients in the art.

A hydraulic lift control ram 48 includes a cylinder 49 pivotally connected to the mobile truck 11 and a piston rod 50 pivotally connected intermediate the ends of the boom 31. Conduits 51 and 52 are connected to the cylinder 49 for retracting and extending the lift ram, respectively. Extending the ram raises the boom and bucket into a conveying position and retracting the ram lowers the boom and bucket into a loading position.

An hydraulic tilt control ram 55 is provided and includes a cylinder 56 pivotally connected to the truck 11 and a piston rod 57 pivotally connected to the upper mounting ear 28. A ram extension conduit 58 and a ram retraction conduit 59 are connected to the cylinder 56. It is to be noted that the tilt control ram 55 and the boom 31, together with their pivotal connections to the bucket 17 and the mobile truck 11, constitute a parallelogram linkage arrangement so that the ram 55 and the boom are always maintained in spaced parallel relation to each other and so that the bucket may be maintained in upright position when the lift control ram raises and lowers the boom. It will be apparent that extension of the ram tilts the bucket forwardly toward a horizontal position while retraction of the ram returns it to an upright position.

Figure 3:
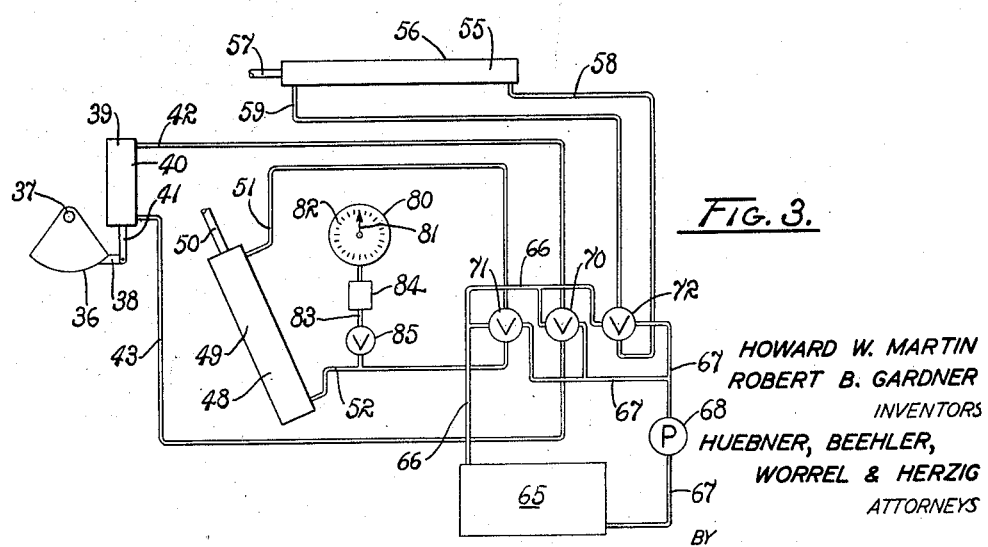
Fig. 3 is a schematic diagram of a hydraulic system utilized with one form of the present invention.

The hydraulic system shown in Fig. 3 includes an hydraulic fluid reservoir or supply 65 having a return conduit 66 and a feed conduit 67 connected thereto. An hydraulic pump 68 is connected to the feed conduit for pumping fluid out of the reservoir. The hydraulic system also includes a gate control valve 70 hydraulically connected to the extend and retract conduits 42 and 43 associated with the gate control ram 39. The gate control valve is also connected to the feed conduit 67 and the return conduit 66 associated with the reservoir 65. This valve is a manual two-way valve having an extend position providing fluid communication between the reservoir feed conduit and the gate ram extend conduit 42 and between the gate ram retract conduit 43 and the reservoir return conduit and a retract position providing fluid communication between the reservoir feed conduit and the gate ram retract conduit 43 and between the gate ram extend conduit 42 and the reservoir return conduit.

An hydraulic lift control valve 71 is provided. It is also a manual two-way valve. The lift control valve has fluid connection to the lift ram extend and retract conduits 52 and 51, respectively, and to the reservoir feed and return conduits 67 and 66. In an extend position the valve 71 connects to the reservoir feed conduit to the lift ram extend conduit 52 and connects the lift ram retract conduit 51 to the reservoir return conduit. In a retract position the lift control valve connects the reservoir feed to the lift ram retract conduit 51 and the lift ram extend conduit to the reservoir return conduit.

Additionally, a manual two-way tilt control valve 72 is provided. This valve is hydraulically connected to the tilt control ram 55 by the conduits 58 and 59 and to the fluid reservoir 65 by the conduits 67 and 66. An extend position of the valve permits fluid to flow from the reservoir feed conduit into the tilt ram extend conduit 58 and from the tilt ram retract conduit 59 to the reservoir return conduit. In a retract position of the valve the fluid flow is reversed in a manner now believed apparent.

An hydraulic pressure responsive gauge or measuring device 80 is included in the hydraulic system of Fig. 3 and has an indicator 81 adapted to move around a dial 82 in response to hydraulic pressure applied thereto. For purpose soon to be apparent, the scale is calibrated in units of weight, for example, in pounds. The gauge is connected in an hydraulic series circuit by a conduit 83 with an hydraulic pressure snubber 84 and a quick-closing, manually operated gauge control valve 85 to the extend conduit 51 for the lift ram 48. As is well known in the art, an hydraulic pressure snubber functions to dampen large peaks of transient or instantaneous, hydraulic pressure surges so that only averaged or effective pressures are transmitted therethrough. In the present system this snubber acts to protect the gauge 80 against sudden pressure variations. The quick-closing valve is in a normally closed position and may be opened manually to permit hydraulic pressure in the extend conduit 51 to act on the gauge.

OPERATION

The operation of this invention is believed to be readily apparent and is briefly summarized at this point.

The earth moving and conveying apparatus 10 is driven over the ground, indicated at 90 in Fig. 1, to a suitable place where a stock pile of aggregate 91, such as sand, dirt, gravel, cement or other material to be loaded is located. For moving the apparatus from place to place, the gate and lift control rams 39 and 48 are normally extended and the tilt control ram 55 is retracted. The apparatus is therefore in a position such as that illustrated in Fig. 1.

To pick up a load, the lift control ram 48 is retracted by setting the lift control valve 71 in its retract position, as above described. This lowers the boom 31 and the bucket 17 into a loading position. The tilt control ram 55 is then extended by setting the tilt control valve 72 in its extend position. It is to be understood that during loading of the bucket, the gate 36 is closed by keeping the gate control ram 39 extended.

The mobile truck 11 is then moved forwardly to scoop a load of aggregate 91 into the bucket 17. The tilt control valve 72 is moved to retract position so as to pivot the bucket into an upright attitude thereby to capture the load therein. The lift control valve 71 is next moved to extend position to elevate the boom 31 and bucket into an upwardly supported position, such as that shown in Fig. 1.

Assuming now that it is desired to determine the weight of the load of aggregate in the bucket 17, the normally closed valve 85 is operated to open the hydraulic circuit to the gauge 80 while the bucket is held at a fixed elevation. Inasmuch as the gauge is calibrated in units of weight and the pressure exerted by the lift ram 48 is proportional to the weight of the load in the bucket, the indicator 81 shows the weight of the load on the scale 82.

If the load is above a predetermined amount, the gate control valve 70 is set in its retract position thereby to retract the gate control ram 39 to open the gate 36. This permits a quantity of the load in the bucket 17 to be discharged through opening 22. When the predetermined weight registers on the gauge 80, the valve 70 is thrown back to extend position to close the gate in a manner believed apparent. The boom 31 is then moved to any desired position where the load is deposited, such as in a mixer, on a truck or the like, not shown.

If, after an initial reading on the gauge 80, it is determined that the weight of the load is below a desired amount, the boom 31 may again be lowered to receive more aggregate 91 in the manner described. In this way the load carried by the bucket 17 may be controlled in a precise manner so that the desired load weight may be obtained. It is obvious that a most efficient operation is achieved by initially picking up a slight excess of aggregate so that precise accuracy can be attained simply by dumping the slight excess.

*Second form*

A second form of the present invention is shown in Figs. 4 to 7. The second form is usable in association with a material handling apparatus such as that represented at 10 in Fig. 1 and thus many details of such apparatus are omitted from the description of the second form.

Figure 4:
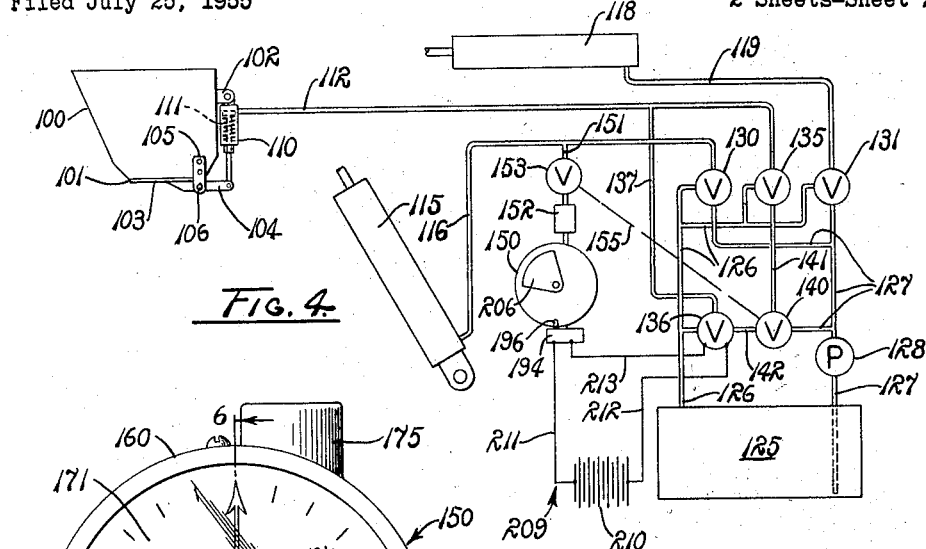
Fig. 4 is a schematic diagram of a hydraulic system utilized with another form of the present invention.

A bucket 100, adapted to be mounted on a boom such as 31 in Fig. 1, is shown in Fig. 4 having a downwardly disposed discharge opening 101 and a rearwardly disposed mounting ear 102. A gate or closure member 103 is mounted on the bucket by an arm 104 having an end secured to the gate and a rearwardly extended end. A bracket 105 is connected to the bucket and is connected pivotally intermediate the ends of the arm, as at 106, to provide a fulcrum for the arm.

An hydraulic gate control ram 110 interconnects the mounting ear 102 and the rearwardly extended end of the arm 104. The ram has an extended position for maintaining the gate 103 in closed position over the discharge opening 101 and a retracted position in which the gate is permitted to open gravitationally under the weight of material loaded in the bucket. When the bucket is empty, and the apparatus is not used a spring 111 in the ram maintans the gate in closed position, as will be apparent. A fluid conductor 112 is connected to the ram.

As before, an hydraulic lift control ram 115 is provided and is adapted to be supported on a mobile truck, such as 11 in Fig. 1, and for connection to a boom, such as 31 in Fig. 1, for supporting the bucket 100. A fluid conductor 116 is connected to lift ram.

Still further, a tilt control ram 118 is included for connection between a mobile truck, such as 11 in Fig. 1, and the bucket 100. The tilt ram also has a fluid conductor 119 connected to the lift ram.

The hydraulic system employed with the second form of the invention, as shown in Fig. 4, includes a fluid reservoir or supply 125 having a fluid return conduit 126 and a fluid feed conduit 127. An hydraulic pump 128 is connected in the feed conduct for forcing fluid out of the reservoir into the system.

Normally, the gate control and lift control rams 110 and 115 are maintained in extended position so as to keep the gate 103 closed and the bucket 100 supported. Likewise, the tilt control ram 118 is normally in retract position.

A manual two-way lift control valve 130 is provided having fluid connection to the feed and return conduits 127 and 126 and to the fluid conductor 116 leading to the lift ram. The valve has a lift position in which fluid is forced from the reservoir feed conduit 127 into the lift ram and a retract position in which fluid is bled from the ram through the fluid conductor 116 into the reservoir return conduit 126.

A tilt control valve 131 is likewise provided and has fluid communication to the reservoir return and feed conduits 126 and 127 and to the fluid conductor 119 for the tilt ram 118. In an extend position the valve provides fluid communication between the feed conduit and the tilt ram through fluid conductor 119 and in a retract position the valve permits bleeding of fluid from the tilt ram through the conductor 119 back through the return conduit.

For controlling the gate ram 110, a manual control valve 135 is employed having fluid connection to the fluid conductor 112 and to the reservoir return conduit 126. Alternately employable for controlling the gate ram is an electrically actuated automatic control valve 136. The automatic valve is in fluid communication with the fluid conductor 112 by means of a connecting conduit 137 and also has connection for fluid flow to the return conduit 126 for the reservoir.

An hydraulic selector valve 140 is utilized to select either the manual control valve 135 or the automatic control valve 136 for operation to control the gate ram 110. The selector valve is a two-position valve having fluid connection to the reservoir feed conduit 127. The selector valve is also connected by means of conduit 141 to the manual control valve and by means of conduit 142 to the automatic control valve. The selector valve has a "manual operation" position in which fluid communication is permitted through the valve from the feed conduit through conduit 141 to the manual control valve and in which fluid passage to the automatic valve is cut off. The selector valve has an "automatic operation" position in which fluid communication is provided from the reservoir feed conduit through conduit 142 to the automatic control valve and in which fluid flow to the manual valve is shut off. The selector valve thus acts alternately and oppositely to enable and disable the manual and automatic valves.

The manual control valve 135 has an extend position in which fluid flow is permitted through the valve from conduit 141 to gate ram conductor 112 and a retract position in which fluid is bled through the valve from the conductor 112 to the return conduit 126. In like manner the automatic control valve 136 has a normal extend position in which fluid communication is established through the valve from the conduit 142 to the conduit 137. When the automatic valve is actuated by electrical impulse, as subsequently described, the valve moves to a retract position in which fluid is bled from the conductor 112 through conduit 137 to the return conduit. For emphasis it is repeated at this point that the manual and automatic valves are alternately employable and that when one of the valves is in use, the other is isolated from effectiveness in the hydraulic system.

In the second form of the invention an hydraulic pressure responsive gauge 150 is also used. As before, the gauge is preferably connected in hydraulic series circuit by conduit 151 with a pressure snubber 152 and a manually operated quick-closing gauge control valve 153 to the fluid conductor 116 for the lift control ram 115.

A mechanical ganged connection 155 is provided between the quick-closing valve 153 and the selector valve 140 so that when the quick-closing valve is in closed position, the selector valve is in "manual operation" position. This is the normal position of the valves. Conversely, however, when the quick-closing valve is opened by manual operation, the selector valve is moved to automatic operation position by the ganged connection.

Figure 5:
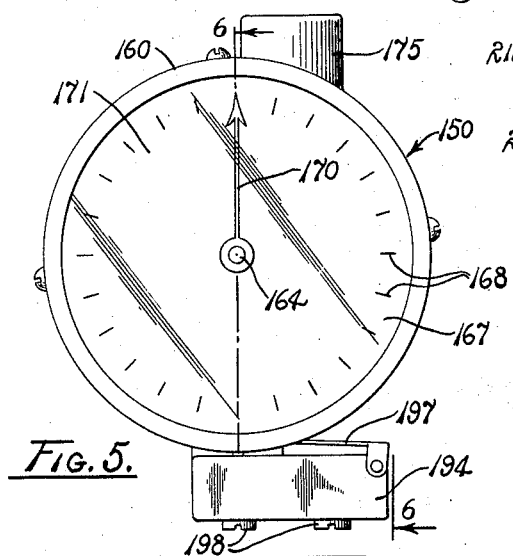
Fig. 5 is a face view of a hydraulic pressure gauge and electrical switch as employed with the form of the invention shown in Fig. 4.
Figure 6:
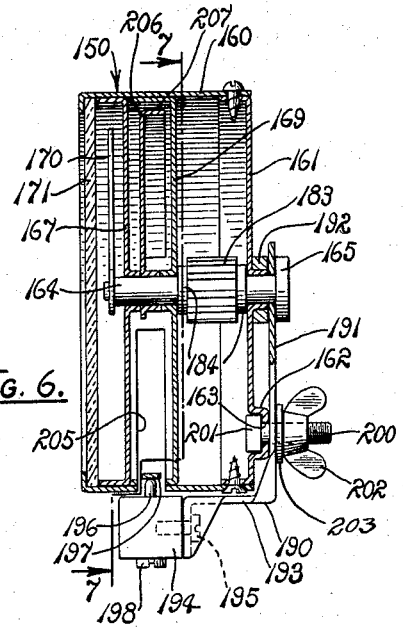
Fig. 6 is a sectional view taken on line 6—6 of Fig. 5.
Figure 7:
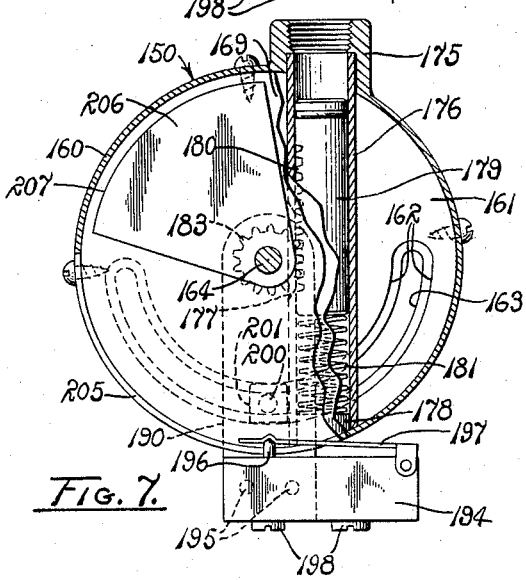
Fig. 7 is a sectional view taken at a position represented by line 7—7 in Fig. 6 and having portions thereof cut away to show parts of the gauge rearwardly thereof.

The details of the hydraulic pressure gauge 150 are shown in Figs. 5 to 7, inclusive, and are presently referred to for description thereof. The gauge provides a substantially cylindrical housing 160 having a back wall 161. The back wall has substantially semi-circular rearwardly extended L-shaped flanges 162 defining an inner arcuate channel and between which is defined an arcuate slot 163. A shaft 164 is journaled in the back wall and extends forwardly concentrically of the housing having a rear headed portion 165 thereon.

A substantially circular peripherally flanged dial plate 167 is fitted on the shaft 164 forwardly in the housing 160 and has a dial 168 on the front face thereof. A peripherally flanged partition 169 is fitted on the shaft intermediate the back wall 161 and the dial plate and in substantially spaced parallel relation thereto. A pointer 170 is secured to the shaft forwardly of the dial plate for registering with the dial. The housing provides an inturned forward rim for mounting a window 171 in front of the dial plate 167.

An eccentric coupling 175 is extended from the housing 160 and is threaded for connection to conduit 151. An elongated sleeve 176 has an end fitted in the coupling and is extended within the housing between the back wall 161 and the partition 169. The sleeve provides an aperture 177 in the side thereof, seen in Fig. 7. A base block 178 is positioned at an opposite end of the sleeve against the housing. A piston 179 is mounted in the sleeve for reciprocal movement and has a plurality of rack teeth 180 thereon adapted for movement past the aperture in the sleeve. A spring 181 is interposed the block and the piston for urging the piston outwardly toward the coupling.

A pinion gear 183 is rigidly mounted on the shaft 164 for rotatable movement therewith and is in mesh with the rack teeth 180 on the piston 179 through the aperture 177 in the sleeve 176. A pair of washers 184 are provided on opposite sides of the pinion gear for preventing undesired axial movement of the shaft.

A bracket, generally indicated at 190, is provided including a support plate 191 supporting the bracket on the shaft 164 forwardly of the headed portion 165 thereof. A collar 192 is provided between the back wall 161 and the support plate. The bracket also includes a mounting flange 193 substantially right angularly forwardly extended from the support plate and mounting an electrical micro-switch 194 thereon by means of bolts 195, or the like. The micro-switch has an actuating pin 196 normally spring-urged into outer position in which the switch is open and adapted for movement to an inner position for closing the switch. An actuating lever 197 is pivotally mounted on the micro-switch and has an end rested on the actuating pin. The switch includes a pair of contact or connecting lugs 198 extended therefrom.

The bracket 190 may be angularly adjusted on the shaft 164 relative to the housing 160 by means of a threaded bolt 200 extended through the support plate 191 and having a head 201 fitted in the channel provided by the arcuate flanges 162. A wing nut 202 is threadably attached to the bolt and a washer 203 is interposed the support plate and the wing nut.

The housing 160 has a substantially semi-circular arcuate slot 205 located between the dial plate 167 and the partition 169 and substantially coterminous with the arcuate slot 163 in the back wall 161. A sector plate 206 having a contact edge 207 is rigidly secured to the shaft 164 intermediate the dial plate and partition and is adapted for rotatable movement with the shaft for engagement of the contact edge with the lever 197 associated with the micro-switch 194.

An electrical circuit 209 is used which includes a battery 210, a connecting lead 211 from the negative pole of the battery to one of the micro-switch contact lugs 198, a connecting lead 212 from the positive pole of the battery to the automatic control valve 136 and a connecting lead 213 between the other micro-switch contact lug and the selector valve.

*Operation of second form*

The operation of the second form is believed to be readily apparent and is briefly summarized at this point.

Assuming that manual operation is desired, the quick-closing valve 153 is left in closed position so that the selector valve 140, by reason of the gang connection 155, is in "manual operation" position. For reasons above described the manual gate control valve 135 is then effective for manual control of the gate control ram 110. Briefly reviewed, the manual valve may be moved between extend and retract positions respectively thereby to extend the ram in which position the gate is closed and the bucket 100 may be loaded or to retract the ram in which position the gate is permitted to open under the weight of a load in the bucket thereby to discharge a portion of the contents thereof.

When automatic operation is desired and assuming a load of material, such as aggregate 91 in Fig. 1, has been loaded into the bucket 100 and elevationally supported thereby, the quick-closing valve 153 is opened. This moves the selector valve 140 by means of the gang connection 155 to "automatic operation" position throwing the automatic control valve 136 into operation and disabling the manual control valve 135. Inasmuch as the automatic control valve is normally in its extend position, the gate 103 initially remains closed.

Opening the valve 153 also opens the hydraulic circuit to the gauge 150. Hydraulic pressure dampened by snubber 152 is transmitted through conduit 151 into the sleeve 176 to urge the piston 179 inwardly thereof. This causes the shaft 164 to rotate due to the intermeshing of the rack teeth 180 with the pinion gear 183.

If the weight of the load in the bucket 100 is above a predetermined value, the sector plate 206 rotates in a clockwise direction, as seen in Fig. 7, far enough to contact the lever 197 to urge the actuating pin 196 of the micro-switch 194 into inner or closed position. This closes the micro-switch and energizes the electrical circuit 209 to actuate the automatic control valve 136. Actuation of the automatic valve moves it from extend position to retract position whereby weight of the load in the bucket urges the gate ram into retract position to bleed fluid from the gate ram fluid conductor 112 through the conduit 137, the automatic valve, and the return conduit 126. The load thus automatically opens the gate 103 by gravity whereby a portion of the load is discharged.

The wide contact edge 207 of the sector plate 206 maintains the micro-switch 194 closed until the weight of the load is at the predetermined value at which time the edges 207 backs off the lever 197 sufficiently to permit the micro-switch to open. The opening of the micro-switch causes de-energization of the electrical circuit 209 and valve 136, the latter thus causing fluid to be fed to the gate ram 110 from the reservoir 125 in a manner now believed evident. The gate 103 closes and confines the load of desired weight in the bucket 100 whereupon it may be conveyed and dumped directly into a mixer or other location where a measured quantity is desired.

If the weight of the load in the bucket 100 is below the predetermined value, the sector plate 206 will not engage the lever 197 and visual observation of pointer 170 will indicate that additional load is needed.

The loosening of wing nut 202 permits movement of the bracket 190 relative to the housing 160. Thus the lever 197 may be positioned so that the sector plate 206 will contact it at any angle within the 180° defined by the arcuate slot 163. In this manner the weight at which the electrical circuit 209 becomes energized can easily be adjusted within defined limits.

While the first form of the invention was described in terms of its employing two-way rams which positively expand and contact and the second form of the invention one way rams, this is intended to demonstrate that either form of ram may be employed in either system with appropriate modification, as will be readily apparent to those skilled in the art.

From the foregoing, it will be evident that a highly effective apparatus has been provided for weighing conveyed load materials. The apparatus is adapted for manual or automatic operation and in either event is dependable in performing its functions. The concurrent weighing and conveying of aggregate or bulk materials made possible by both forms of the invention save significant amounts of labor, time and expenses in operations of the character described.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A load weighing conveyor comprising a load receiving receptacle having a discharge opening therein; means mounting the receptacle for elevational movement; a gate supported on the receptacle for movement between open and closed positions relative to the opening; an hydraulic ram supported by the mounting means and connected to the gate reciprocally operable to open and to close the gate; electrically actuated hydraulic control means in fluid communication with the ram; an hydraulic lift means attached to the mounting means for elevating the receptacle; hydraulic pressure responsive means connected to the hydraulic lift means; and electrical switch means triggered by the pressure responsive means at a predetermined pressure to actuate said hydraulic control means.

2. An automatic load weighing apparatus comprising a receptacle for receiving a load and having a discharge opening therein, a closure member mounted on the receptacle for movement between open and closed positions relative to the discharge opening, hydraulic control means connected to the closure member for moving it to open position, elevational control means connected to the receptacle adapted to supply controlled supporting force to the receptacle, a source of operating power connected to the elevational control means, and an automatic control system responsive to supporting force exerted by the elevational control means connected to the source of operating power and having controlling connection to the hydraulic control means adapted to open the closure member when the supporting force exceeds a predetermined level.

3. In combination, a support, a receptacle having a discharge opening, a gate mounted on the receptacle for movement between a closed position in the opening and a retracted position, a gate control ram mounted on the receptacle and connected to the gate, an elevational control ram mounted on the support and connected in supporting relation to the receptacle, manual and automatic valves connected to the gate control ram, a source of hydraulic fluid under pressure, control means connected to the source of fluid and to the valves and having a manual operation position in which the manual valve is connected to the source and the automatic valve is disconnected therefrom and an automatic operation position in which the automatic valve is connected to the source and the manual valve is disconnected therefrom, and means connected to the elevational control ram and to the automatic valve responsive to a predetermined support pressure applied to the receptacle by the elevational ram for operating the automatic valve to open the gate.

4. A load weighing conveyor comprising a support, a receptacle for receiving a load, hydraulically powered means mounted on the support and connected in supporting relation to the receptacle, hydraulic discharge control means connected to the receptacle for discharging loads therefrom, a manual hydraulic control valve and an electrically activated automatic hydraulic control valve alternately employable and individually connected to the discharge control means, a source of hydraulic power, an hydraulic selector valve connected to the source and having alternately selected positions alternately connecting the source to the manual control valve, and to the automatic control valve, an hydraulic pressure gauge, an hydraulic circuit providing fluid communication between the gauge and the powered means and including a gauge control valve for opening and closing said circuit, means interconnecting the gauge control valve and the selector valve for controlling the position of the selector valve in response to positioning of the gauge control valve, electrical means connected to the automatic control valve and operable upon energization to actuate the automatic valve, and switch control means connected to the gauge and to the electrical means for energizing the electrical means at a predetermined pressure.

5. In combination with a principal ram and an auxiliary ram, an hydraulic system for controlling the auxiliary ram in response to pressure exerted by the principal ram comprising a manually operable hydraulic control system connected to the auxiliary ram for delivering and releasing hydraulic fluid to and from such ram, an electrically actuated automatic hydraulic control system connected to the auxiliary ram for delivering and releasing hydraulic fluid to and from such ram and being alternately employable with the manual control means, a source of hydraulic fluid under pressure, an hydraulic selector valve having a manual operating position connecting the manual control system to the source and disconnecting the automatic control system from the source and an automatic operating position connecting the automatic control system to the source and disconnecting the manual control system from the source, an hydraulic pressure responsive means, an hydraulic circuit providing fluid communication between the pressure responsive means and the principal ram and including a control valve for opening and closing the circuit to the pressure responsive means, means interconnecting the control valve and the selector valve for controlling the position of the selector valve in response to the position of the control valve, and electrical means interconnecting the automatic control system and the pressure responsive means and operable in response to a predetermined pressure to actuate the automatic control system.

6. A load weighing conveyor comprising a support, a receptacle for receiving a load to be weighed and having a discharge opening, a gate mounted on the receptacle for movement between a position closing the opening and a position retracted therefrom, an hydraulic gate ram mounted on the support and connected to the gate, means mounting the receptacle on the support for elevational movement, an hydraulic lift ram mounted on the support and connected to the receptacle mounting means for applying a supporting force to the receptacle, manual hydraulic control means connected to the gate ram for delivering and releasing hydraulic fluid to and from the gate ram, electrically actuated automatic hydraulic control means connected to the gate for delivering and releasing hydraulic fluid to and from the gate ram adapted for selective use alternately with the manual control means, a source of hydraulic fluid under pressure, an hydraulic selector valve connected to said source and to the manual control means having a first position connecting the source to the manual control means and disconnecting the source from the automatic control means and a second position connecting the source to the automatic control means and disconnecting the source from the manual control means, an hydraulic pressure responsive gauge, an hydraulic circuit providing fluid communication between the gauge and the lift ram and including a control valve for opening and closing said circuit to the gauge, means interconnecting the control valve and the selector valve to position the selector valve in its second position when the control valve opens said circuit and to position the selector valve in its first position when the control valve closes said circuit, and electrical control means operably inter-connecting the gauge and the automatic control means and responsive to a predetermined pressure to actuate the automatic control means.

7. An automatic aggregate weighing conveyor comprising a support; a boom pivotally mounted on the support for vertical swinging movement around a substantially horizontal axis; a lift control ram mounted on the support and connected to the boom for controlling vertical movement thereof; an hydraulic control circuit connected to the lift control ram for delivering and releasing hydraulic fluid to and from the ram; a bucket mounted on the boom adapted to receive a load of aggregate and having a downwardly disposed opening therein; a gate mounted on the bucket having a closed position in covering relation to the opening and being adapted for gravitational movement to an open position away from the opening in response to the weight of a load in the bucket; a gate control ram connected to the gate having an extended position for holding the gate in closed position and a retracted position permitting the gate gravitationally to open; manual hydraulic control means connected to the gate control ram alternately positionable to deliver hydraulic fluid to the gate control ram for extension thereof and to release such fluid for retraction thereof; automatic electrically operable hydraulic control means connected to the gate control ram normally positioned to deliver hydraulic fluid to the gate control ram for extension thereof and being operable upon electrical actuation thereof to release such fluid for retraction of the ram; a source of hydraulic fluid under pressure; an hydraulic selector valve having a manual operation position connecting said source to the manual control means and disconnecting the source from the automatic control means and an automatic operation position connecting said source to the automatic control means and disconnecting the source from the manual control means; an hydraulic pressure responsive gauge calibrated to read in units of weight of the load in the bucket; valve control means connected to the hydraulic gauge alternately positionable to connect and to disconnect the gauge to and from the hydraulic circuit; gang control means interconnecting the valve control means and selector valve operable to position the selector valve in its manual operation position when the control valve disconnects the gauge from the hydraulic circuit and to position the selector valve in its automatic operation position when the control valve connects the gauge to the hydraulic circuit; an electrical circuit connected to the automatic hydraulic control means including an electrical switch on the gauge and having a closed position for energizing the circuit and an open position; a triggering member mounted on the gauge and movable in response to actuation of the gauge for closing the electrical switch at a predetermined pressure; and means interconnecting the gauge and the electrical switch for adjusting the predetermined pressure at which said triggering member is operable.

8. An apparatus for weighing a load comprising a load receiving receptacle having a discharge opening therein; means mounting the receptacle for elevational movement; a gate supported on the receptacle for movement between open and closed positions relative to the opening; an hydraulic ram connected to the gate reciprocally operable to open and to close the gate; electrically actuated hydraulic control means in fluid communication with the ram; an hydraulic lift means attached to the mounting means for elevating the receptacle; hydraulic pressure responsive means connected to the hydraulic lift means; and electrical means interconnecting the hydraulic control means and the pressure responsive means and triggered by the pressure responsive means at a predetermined pressure to actuate said hydraulic control means to open said gate.

9. In combination, a support, a receptacle having a discharge opening, a gate mounted on the receptacle for movement between a closed position over the opening and a retracted position, a gate control member mounted on the receptacle having a rod adapted for reciprocal movement incident to actuation and de-actuation of the gate control member and connected to the gate for imparting movement thereto, an elevational control member mounted on the support having a rod adapted for reciprocal movement as the elevational control member is actuated and deactuated and connected in supporting relation to the receptacle, a manually operated switch means connected to the gate control member, an automatically operable switch means connected to the gate control member, a source of operating power, a selector connected to the source of power and to the manually and automatically operable switch means and having a manual operation position in which the manually operable switch means is connected to the source of power and the automatically operable switch is disconnected from the source of power and an automatic operation position in which the automatically operable switch means is connected to the source of power and the manually operable switch means is disconnected from the source of power, and means connected to the elevational control member and to the automatically operable switch means respective to a predetermined supporting force exerted on the receptacle by the elevational control member for operating the automatically operable switch means to open the gate.

10. A load weighing and conveying apparatus comprising a mobile truck providing a cab, a boom pivotally mounted on the mobile truck for reciprocal elevational movement about a substantially horizontal axis between load scooping and load carrying positions and having an extended end, a bucket mounted on the extended end of the boom having a discharge opening therein, a gate supported on the bucket for movement between open and closed positions relative to the discharge opening, an hydraulic ram pivotally interconnecting the truck and the boom operable to raise and to lower the boom, an hydraulic ram pivotally interconnecting the gate and the bucket operable to open and to close the bucket, an hydraulic system having a source of hydraulic fluid under pressure connected to the rams and providing manual control valves independently operable to actuate the rams, said system including a high pressure line connected to the boom actuating ram through which hydraulic fluid under pressure is forced to raise the boom subject to excessive pressures incident to pivotal movement of the boom to cause the bucket to dig into load material and incident to retention of the boom in load-scooping position as the truck is moved to force the bucket into load material, an hydraulic pressure gauge mounted in a position for visual reference by an operator in the cab calibrated in units of weight of loads contained in the bucket, and a valve operable by an operator in the cab connecting the gauge to the high pressure line operable to isolate the gauge from the high pressure line when said line is subject to excessive pressures of loading and operable while loads are supported in the bucket to weigh the loads.

11. An aggregate weighing and transporting apparatus comprising a vehicle adapted for earth traversing movement and having predetermined forward and rearward end portions; a boom pivotally mounted on the vehicle and forwardly extended therefrom for vertical movement about a substantially horizontal axis transversely disposed to the vehicle; a lift control ram pivotally interconnecting the vehicle and the boom for controlled elevational movement of the boom; a bucket pivotally mounted on the extended end of the boom for movement about a substantially horizontal axis between a downwardly tilted load-scooping position adapted to receive a load upon forward movement of the vehicle and an upwardly pivoted load-transporting position; hydraulically actuated means for discharging load material from the bucket; hydraulically actuated means operably associated with the bucket adapted selectively to position the bucket in the load-scooping and load-transporting positions; an hydraulic system including a source of hydraulic fluid under pressure, a tilt control valve having fluid connection to the source of fluid under pressure and to the bucket positioning means, a bucket discharging valve having fluid connection to the source of fluid under pressure and to the load discharging means, and a lift control valve having fluid connection to the source of fluid under pressure and to the lift control ram adapted selectively to raise and to lower the boom, said hydraulic system including a conduit interconnecting the source of fluid under pressure, the lift control valve and the lift control ram subject to excessive pressures incident to pivotal movement of the boom to cause the bucket to dig into load material and incident to retention of the boom with the bucket in load-scooping position as the vehicle is driven to force the bucket into loading material; a pressure gauge in fluid connection to said conduit; and valve means interposed between the gauge and the conduit operable to isolate the gauge from said conduit while it is subject to the excessive pressures of loading and openable while loads are supported in the bucket to expose the gauge to the load supporting pressure to weigh the load.

12. An aggregate weighing and transporting apparatus comprising a vehicle adapted for earth traversing movement and having predetermined forward and rearward end portions; a boom pivotally mounted on the vehicle and forwardly extended therefrom for vertical movement about a substantially horizontal axis transversely disposed to the vehicle; a lift control ram pivotally interconnecting the vehicle and the boom for controlled elevational movement of the boom; a bucket pivotally mounted on the extended end of the boom for movement about a substantially horizontal axis between a downwardly tilted load-scooping position adapted to receive a load upon forward movement of the vehicle and an upwardly pivoted load-transporting position, said bucket having a load receiving opening and a load discharging opening; a gate mounted on the bucket having a closed position in covering relation to the discharging opening and an open position retracted from the opening; a gate control ram pivotally interconnecting the bucket and the gate having a predetermined position for holding the gate in closed position and a retracted position for opening of the gate; a tilt control ram pivotally connected to the bucket adapted selectively to position the bucket in the load-scooping and load-transporting positions; a source of hydraulic fluid under pressure; an hydraulic tilt control circuit including a valve having fluid connection to the source of fluid under pressure and to the tilt control ram adapted selectively to tilt the bucket between load-scooping and load-transporting positions; an hydraulic gate control circuit including a valve having fluid connection to the source of fluid under pressure and to the gate control ram adapted selectively to move the gate between closed and retracted positions; an hydraulic lift control circuit including a valve having fluid connection to the source of fluid under pressure and to the lift control ram adapted selectively to raise and to lower the boom, said lift control circuit including a conduit interconnecting the source of fluid under presure, the valve and the lift control ram subject to excessive pressures incident to pivotal movement of the boom to cause the bucket to dig into load material and incident to retention of the boom with the bucket in load-scooping position as the vehicle is driven to force the bucket into loading material; a manually operable gauge control valve connected to said conduit; an hydraulic snubber in fluid connection to the manually operable gauge control valve adapted to dampen large peaks of transient or instantaneous hydraulic surges therethrough; and a pressure gauge connected to the snubber, the gauge control valve being operable to isolate the snubber and gauge from said conduit while it is subject to the excessive pressures of loading and openable while loads are supported in the bucket to expose the gauge to the load supporting pressure to weigh the load.

13. An aggregate weighing and transporting apparatus comprising a vehicle adapted for earth traversing movement and having predetermined forward and rearward end portions; a boom pivotally mounted on the vehicle and forwardly extended from the vehicle for vertical movement about a substantially horizontal axis transversely disposed to the vehicle; a lift control ram pivotally interconnecting the vehicle and the boom for controlled elevational movement of the boom; a bucket pivotally mounted on the extended end of the boom for movement about a substantially horizontal axis between a downwardly tilted load-scooping position adapted to receive a load upon forward movement of the vehicle and an upwardly pivoted load-transporting position, said bucket having a load receiving opening and a load discharging opening; a gate mounted on the bucket having a closed position in covering relation to the discharging opening and an open position retracted from the opening; a gate control ram pivotally interconnecting the bucket and the gate having a predetermined position for holding the gate in closed position and a retracted position for opening of the gate; a tilt control ram pivotally connected to the bucket adapted selectively to position the bucket in the load-scooping and load-transporting positions; a source of hydraulic fluid under pressure including a reservoir and a pump adapted to receive hydraulic fluid from the reservoir and to supply the fluid under pressure; an hydraulic tilt control circuit including a valve having fluid connection to the reservoir and to the pump and fluid connection to opposite ends of the tilt control ram adapted selectively to deliver hydraulic fluid from the pump under pressure to the ends of the tilt control ram while bleeding fluid from the opposite ends of said ram back to the reservoir; an hydraulic gate control circuit including a valve having fluid connection to the reservoir and to the pump and fluid connection to opposite ends of the gate control ram adapted selectively to deliver hydraulic fluid from the pump under pressure to the ends of the gate control ram while bleeding fluid from the opposite ends of said ram back to the reservoir; an hydraulic lift control circuit including a valve having fluid connection to the reservoir and to the pump and fluid connection to opposite ends of the lift control ram adapted selectively to deliver hydraulic fluid from the pump under pressure to the ends of the left control ram while bleeding fluid from the opposite ends of said ram back to the reservoir, said lift control circuit including a conduit interconnecting the lift control valve and one end of the lift control ram subject to excessive pressures incident to pivotal movement of the boom to cause the bucket to dig into load material and incident to retention of the boom with the bucket in load-scooping position as the vehicle is driven forwardly to force the bucket into load material; a gauge control valve connected to said conduit; an hydraulic snubber in fluid connection to the gauge control valve adapted to dampen large peaks of transient or instantaneous hydraulic surges therethrough; and a pressure gauge connected to the snubber calibrated in units of weight supported by the lift control ram, the gauge control valve being operable to isolate the snubber and gauge from said conduit while it is subject to the excessive pressures of loading and openable while loads are supported in the bucket to expose the gauge to the load supporting pressure to weigh the load.

14. An aggregate weighing and transporting apparatus comprising a vehicle; a load receiving receptacle; means mounting the receptacle for elevational movement on the vehicle; an hydraulic ram operably associated with the receptacle to discharge contents from the receptacle when actuated; electrically actuated hydraulic control means in fluid communication with the ram; an hydraulic lift means attached to the mounting means for elevating the receptacle; hydraulic pressure responsive means connected to the hydraulic lift means; and electrical means interconnecting the hydraulic control means and the pressure responsive means and triggered by the pressure responsive means at a predetermined pressure to actuate said hydraulic control means to actuate the ram for discharge of contents from the receptacle.

References Cited in the file of this patent

UNITED STATES PATENTS

| 607,465 | Richards | July 19, 1898 |
| 1,101,322 | Norbo | June 23, 1914 |
| 1,402,661 | Samuels | Jan. 3, 1922 |
| 2,273,180 | De Castro | Feb. 17, 1942 |
| 2,339,152 | Connelly et al. | Jan. 11, 1944 |
| 2,372,408 | Trich | Mar. 27, 1945 |
| 2,635,868 | Reid et al. | Apr. 21, 1953 |
| 2,668,631 | Reese | Feb. 9, 1954 |
| 2,679,326 | Isaksen | May 25, 1954 |
| 2,679,327 | Hren | May 25, 1954 |
| 2,706,623 | Styes | Apr. 19, 1955 |
| 2,742,162 | Mandt | Apr. 17, 1956 |

FOREIGN PATENTS

| 141,111 | Sweden | June 30, 1953 |